United States Patent [19]

Yamashita et al.

[11] Patent Number: 4,689,163
[45] Date of Patent: Aug. 25, 1987

[54] RESIN-BONDED MAGNET COMPRISING A SPECIFIC TYPE OF FERROMAGNETIC POWDER DISPERSED IN A SPECIFIC TYPE OF RESIN BINDER

[75] Inventors: Fumitoshi Yamashita, Ikoma; Masami Wada; Shuichi Kitayama, both of Osaka, all of Japan

[73] Assignee: Matsushita Electric Industrial Co., Ltd., Japan

[21] Appl. No.: 937,424

[22] Filed: Dec. 3, 1986

[30] Foreign Application Priority Data

Feb. 24, 1986 [JP] Japan .................................. 61-38830
May 12, 1986 [JP] Japan ............................... 61-107907
Jun. 30, 1986 [JP] Japan ............................... 61-153130

[51] Int. Cl.$^4$ ........................ C08B 35/04; H01F 1/26
[52] U.S. Cl. .............................. 252/62.54; 252/62.55; 335/296; 335/302; 335/303
[58] Field of Search .......................... 252/62.54, 62.55; 335/296, 303, 302; 75/123 B

[56] References Cited

U.S. PATENT DOCUMENTS

| 4,278,556 | 7/1981 | Tada | 252/62.54 |
| 4,289,549 | 9/1981 | Kasai | 252/62.54 |
| 4,308,155 | 12/1981 | Tada et al. | 252/62.54 |
| 4,496,395 | 1/1985 | Croat | 75/123 |
| 4,497,722 | 2/1985 | Tsuchida | 252/62.54 |
| 4,562,019 | 12/1985 | Inoue | 252/62.54 |
| 4,607,068 | 8/1986 | Ansel | 252/62.54 |

FOREIGN PATENT DOCUMENTS 57-170501 10/1982 Japan .

Primary Examiner—Arthur P. Demers
Attorney, Agent, or Firm—Lowe, Price, LeBlanc, Becker & Shur

[57] ABSTRACT

A resin-bonded magnet comprising particles of a melt-quenched ferromagnetic material of the formula, Fe-B-R, in which R represents Nd and/or Pr, and a binder resin dispersing the particles throughout the resin and fixing the particles. The binder resin comprises an oligomer having at least an alcoholic hydroxyl group and a block isocyanate with an active hydrogen-bearing compound. The resin-bonded magnet is preferably used in the from of a cylinder, ring or column having a defined outer diameter and a defined density when applied to permanent magnet motors.

14 Claims, 14 Drawing Figures

RESIN-BONDED MAGNET COMPRISING A SPECIFIC TYPE OF FERROMAGNETIC POWDER DISPERSED IN A SPECIFIC TYPE OF RESIN BINDER

BACKGROUND OF THE INVENTION

1. Field of the Invention

This invention relates to resin-bonded magnets which have wide utility in the field of mechatronics and are used, for example, in pulse motors, servo motors, actuators and the like. More particularly, the invention relates to resin-bonded magnets which comprise ferromagnetic Fe-B-R alloys, in which R represents Nd and/or Pr, in the form of a powder dispersed throughout and fixed in a binder resin. The term "resin-bonded magnet" used herein is intended to mean a magnet which comprises a ferromagnetic powder dispersed throughout a resin binder, after which the dispersion is molded as desired.

2. Description of the Prior Art

Sintered magnets of rare earth metal and cobalt alloys or intermetallic compounds are known including those of $RCo_5$ or $R(Co, Cu, Fe, M)_n$ in which R is a rare earth metal such as Sm, Ce and the like, M is one or more elements of groups IV, V, VI and VII of the periodic table, and n is an integer of from 5 to 9. However, these magnets are disadvantageous in that it is very difficult to shape the alloys in the form of a cylinder and to render it magnetically anisotropic along the radial direction of the cylinder. The main reason for this is considered due to the fact that the cylinder suffers a difference in expansion coefficient during the sintering process on the basis of the anisotropy. Although the difference in the expansion coefficient is, more or less, influenced by the degree of magnetic anisotropy and the shape of the cylinder, this generally has to be overcome by rendering the cylinder isotropic. This involves a disadvantage in that while magnetic characteristics should intrinsically reach 20 to 30 MGOe in terms of maximum energy product, it lowers to about 5 MGOe along the radial direction of the cylinder. For application of the cylindrical magnet to permanent magnet motors such as pulse motors, servo motors and actuators in which a high dimensional accuracy is required, grinding is necessary after sintering, resulting in a poor yield of the magnet product. In addition, since expensive Sm and Co are used as the main components of the magnet, the magnetic characteristics are not worth the economy. Generally, the sintered magnet is mechanically brittle, so that part of the magnet is liable to come off and fly. If this would occur at a space between a rotor and a stator of the motor or at a sliding portion, the motor would suffer a serious problem with respect to maintenance of their performance and reliability.

With resin-bonded magnets using rare earth metal and cobalt alloys, the difference in expansion coefficient between rare earth metals and cobalt rendered magnetically anisotropic along the radial direction can be absorbed with a matrix resin. Accordingly, the resultant magnet has magnetic anisotropy along the radial direction. In recent years, it has been found that when injection-molded resin-bonded magnets of rare earth metal and cobalt alloys are rendered magnetically anisotropic along an axial direction, a maximum energy product reaches 8 to 10 MGOe. Moreover, the resin-bonded magnet has a density lower by approximately 30% than sintered magnets, can be designed to have a high dimensional accuracy, and is improved in mechanical brittleness. Accordingly, when required to impart magnetic anisotropy along the radial direction, the resin-bonded magnet is considered to be preferable.

In order to impart the magnetic anisotropy along the radial direction of a resin-bonded magnet cylinder of rare earth metal and cobalt alloys, Japanese Laid-open Patent Application No. 57-170501 describes a means of generating a magnetic field for rendering the rare earth metal and cobalt alloy magnetically anisotropic along the radial direction. This means includes a mold having a magnetic yoke and a non-magnetic yoke arranged to surround a cavity, and a magnetizing coil provided around the mold, or a mold having a magnetizing coil embedded in the cavity. In order to cause a predetermined intensity of magnetic field to generate in the cavity, a high voltage, low current power supply is ordinarily used with a magnetomotive force being great. However, a magnetic path has to be so long as to cause a magnetic flux produced by energization of the yokes with the magnetizing coil from the outer surface of the mold to be effectively focussed with the cavity. Especially, with a small-sized magnet, a substantial amount of the magnetomotive force is lost or consumed as a leakage flux. As a result, it becomes difficult to impart a sufficient degree of magnetic anisotropy along the radial direction.

As will be appreciated from the above, the resin-bonded magnet of rare earth metal and cobalt alloys may develop better magnetic characteristics than sintered magnets of rare earth metal and cobalt alloys when the magnetic anisotropy along the radial direction is necessary. However, the magnetic characteristics of the resin-bonded magnet is greatly influenced by the shape of the magnet. This is disadvantageous in that satisfactory magnetic characteristic properties along the radial direaction cannot be expected when there is a pronounced tendency toward miniaturization and lightweight.

On the other hand, with Fe-B-R intermetallic compounds or alloys obtained by a method similar to rare earth metal and cobalt alloys, particles of the alloy having a size of about 3 micrometers are magnetically anisotropic in nature because generation of a coercive force in the particles or movement of a magnetic wall results from pinning. More particularly, if the alloy is finely divided to an extent sufficient to form a single magnetic domain, the particles become magnetically anisotropic. Accordingly, the magnet from the Fe-B-R alloys have characteristic properties of both sintered and resin-bonded magnets of rare earth metal and cobalt alloys. For example, particles of an alloy having a typical atomic composition of $Fe_{77}B_8Nd_{15}$ is compressed in a magnetic field of about 10 KOe under a pressure of about 1.5 tons/cm$^2$, sintered at a temperature of 1000° C. to 1200° C. in a stream of Ar and thermally heated at 500° to 600° C., thereby obtaining a sintered magnet. This sintered magnet can develop a coercive force. The magnet has a BCC phase which precipitates at grain boundaries and Nd is more susceptible to oxidation with air on the surface of the magnet than Fe. For these reasons, Fe-B-R alloys are more difficult in making a resin-bonded magnet than rare earth metal and cobalt alloys, typical of which are those alloys of $Sm(Co, Cu, Fe, M)_n$.

SUMMARY OF THE INVENTION

It is accordingly an object of the invention to provide a resin-bonded magnet which is readily manufactured with good magnetic characteristics.

It is another object of the invention to provide a resin-bonded magnet which enables one to cope with a recent tendency toward miniaturization and high performance of the magnet.

It is a further object of the invention to provide a resin-bonded magnet which comprises particles of a Fe-B-R alloy dispersed in a resin binder.

According to the present invention, there is provided a resin-bonded magnet which comprises particles of a melt-quenched ferromagnetic material of the formula, Fe-B-R, in which R represents Nd and/or Pr, and a binder resin dispersing the particles throughout the resin and fixing the particles, the binder resin comprising an oligomer having at least an alcoholic hydroxyl group and a block isocyanate with an active hydrogen-bearing compound. Preferably, the magnet is shaped in the form of a cylinder, ring or column having an outer diameter of not larger than 25 mm and a density of not less than 5.0 g/cm$^3$.

DETAILED DESCRIPTION AND EMBODIMENTS OF THE INVENTION

The Fe-B-R alloys or intermetallic compounds, in which R is Nd and/or Pr, have a composition of the formula, $Nd_{1-x}(Fe_{1-y}, B_y)_x$ in which $0.5 \leq x \leq 0.9$ and $0.05 \leq y \leq 0.10$. These alloys are readily obtained by homogeneously alloying a mixture of the respective elements in suitable proportions as usual. Starting material for the alloying may be ferro-Nd, ferro-B and Fe. In practice, the alloy is used in the form of plate-like particles. For the formation of the particles, a molten alloy or a melt is passed through an orifice in an atmosphere of an inert gas such as, for example, argon and dropped between rolls, during which the molten alloy is quenched, thereby obtaining a rapidly quenched ribbon. The quenched ribbon is suitably milled to obtain plate-like particles having a thickness of about 10 to 30 micrometers and a major length from several tens to several hundreds micrometers. These particles are considered to have such a microstructure that a very fine Fe-B-R ternary alloy phase is sporadically present in orthohombic and tetragonal $FE_3B$ phases and are magnetically isotropic in nature. The melt-quenched Fe-B-R alloy may be either an alloy which is obtained by a process in which the quenched ribbon is obtained in an amorphous state and subsequently heated to a temperature higher than a crystallization temperature of the alloy to have the Fe-B-R ternary alloy phase sporadically precipitated in $Fe_3B$, or an alloy which has a final microstructure when quenched. In view of magnetic characteristics, Nd is preferably used as R in the Fe-B-R alloy. The alloy may inevitably comprise other elements such as Si, Mo, Al, Co, Zr, Pd, Y, Tb and the like, which orignate from the starting materials used for the alloying. However, these elements may be contained in amounts not impeding the characteristic properties of the melt-quenched Fe-B-R alloy based on the microstructure.

The particles of the melt-quenched alloy of the invention may individually have a surface coating of a monomolecular or higher layer such as, for example, of a carbon functional silane. Examples of the carbon functional silane include γ-glycidoxypropyltriethoxysilane, γ-aminopropyltrimethoxysilane, N-b-(aminoethyl)-γ-aminopropyltrimethoxysilane, γ-mercaptopropyl trimethoxysilane and the like. Other organic compounds such as organic titanate compounds may be likewise used for this purpose. The formation of the surface coating on the individual particles is preferred because compatibility with a resin binder is improved.

In the practice of the invention, these alloy particles are fixed with a resin binder which comprises an oligomer having at least an alcoholic hydroxyl group and a block isocyanate or isocyanate regenerator.

Useful oligomers are an oligoether of the following formula (1) and an oligoether ester of the following formula (2)

in which $R_1$ is —S—, —O—, —SO—, —SO$_2$ or an aliphatic residue such as —CH$_2$, —CH$_2$CH$_2$—, —C(CH$_3$)$_2$— or the like, each $R_2$ represents hydrogen or a lower alkyl group such as —CH$_3$, —C$_2$H$_5$ or the like, $R_3$ represents an aliphatic, aromatic or alicyclic residue, and n and m are, respectively, an integer of from 1 to 100. Typical examples of the residue represented by $R_3$ include —CH$_2$=CH$_2$— or the like. Of these, the oligoether having a molecular weight of not less than 900 is preferred.

The block isocyanate compounds used in combination with the oligomer are diisocyanate adducts with active hydrogen-bearing compounds. Examples of the diisocyanates include aromatic isocyanate compounds such as p-phenylene diisocyanate, m-phenylene diisocyanate, 2,4-tolylene diisocyanate, 2,6-tolylene diisocyanate, p,p'-diphenylene diisocyanate, p,p'-diphenylmethane diisocyante, p,p'-diphenyl ether diisocyanate, p,p'-diphenylsulfone diisocyanate, p,p'-benzophenone diisocyanate, and mixtures thereof. These isocyanate compounds are preferably introduced with aromatic imides. The introduction of aromatic imides may be effected, for example, by subjecting aromatic carboxylic anhydrides and diisocyanates to decarbonation in solvents such as m-cresol, N,N'-dimethylformamide, N,N'-dimethylacetoamide, methylpyrrolidone and the like, by a known manner.

The active hydrogen-bearing compounds may be any compounds which have active hydrogen and are able to form adducts with the isocyanates. Examples of the compounds include various amines, acidic sulfites, tertiary alcohols, lactams, mercaptans, enol compounds, oximes, phenols and the like. Specific and preferable examples include phenol, m-cresol, xylenol and the like. This is because these compounds can yield isocyanate adducts whose thermal dissociation temperature is within a relatively low range.

The oligomer and the isocyanate adduct may be mixed in an arbitrary ratio and are preferably mixed in a stoichiometrically equivalent ratio with respect to the alcoholic hydroxyl groups of the oligomer and the isocyanate groups, i.e. OH/NCO=1.

The resin binder is generally used in an amount of from 1 to 6 wt %, preferably from 1.5 to 4 wt %, of the melt-quenched Fe-B-R resin bonded magnet.

Moreover, other additives such as processing aids, plasticizers, antioxidants and the like may be added to the resin-bonded magnet composition, if necessary.

For the fabrication of the resin-bonded magnet according to the invention, an Fe-B-R alloy is molten and dropped through an orifice, for example, between rolls where the molten alloy is quenched to obtain a quenched ribbon. This ribbon is subsequently broken to pieces by a suitable means to have a size and a thickness as defined before. These pieces are mixed with a resin binder in a suitable mixing ratio, followed by curing the resin binder at a suitable temperature for the resin binder used with or without aligning the magnetic pieces in a magnetic field.

The resin-bonded magnet of the invention is particularly suitable for use in a permanent magnet-type motor which may be either of a so-called permanent magnet rotor type or of a permanent magnet field type. As such motors, there may be mentioned pulse motors, direct current motors and the like. The magnet used in these types of permanent magnet motors should be in the form a ring, a cylinder or a column which has been multipolarly magnetized and should have an outer diameter of not larger than 25 mm. The outer diameter over 25 mm is not favorable because the effects of the resin-bonded magnet of the invention are almost lost in view of the properties of such motors. In addition, the density of the resin-bonded magnet should be determined to be not less than 5.0 g/cm$^3$ for the reason as will be described in examples.

Preferably, practice, the melt-quenched Fe-B-R alloy particles dispersed in a resin binder are magnetically aligned, after which they are fixed with the resin binder. Any known techniques of generating a magnetic field in a molding cavity may be used as a means for magnetically aligning the particles. For instance, a mold may be used in which aligning yokes having magnetic poles are provided in position around a cavity and a conductive wire is mounted in the yokes. In this system, the magnetic poles are energized by application of an electric current to the conductive wire in the yokes. For generation of a pulse magnetic field, there is used an instantaneous DC power supply in which a pulse current is generated by an all thyristor full-wave phase control system in which commercial frequency AC power is inputted, or by an instantaneous DC power supply in which an AC power is increased to a predetermined DC voltage and rectified, after which it is charged in a group of capacitors and discharged through a thyristor. Of course, the aligning means is not limited to those described above, but any known means may also be used in the practice of the invention.

The alignment of the melt-quenched Fe-B-R particles, which are used, for example, in magnetic poles of a permanent magnet motor, means that a density of the permanent magnet becomes inhomogeneous. In particular, the magnet poles become higher in density than a portion between the poles. With a permanent magnet rotor-type motor, a relatively low inertia force is realized while keeping the performance of the motor. Thus, the motor using the resin-bonded magnet of the invention is particularly effective as a permanent magnet motor of the type in which an incremental operation is carried out.

The present invention is more particularly described by way of examples. Comparative examples are also shown.

EXAMPLE 1

Magnet alloys:

In this example, magnet alloys are described.

Figure 1:
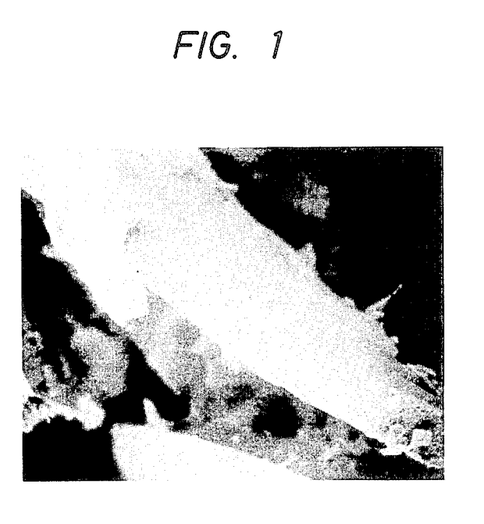
FIG. 1 is a microphotograph showing a particulate structure of an Fe-B-R alloy obtained by melt quenching.

Alloys having an atomic composition of $Fe_{81}B_6Nd_{13}$ which had been melted in a high-frequency melting furnace in an atmosphere of Ar were each continuously dropped between rolls to obtain a melt-quenched ribbon. The thus obtained ribbon was suitably broken into pieces having a thickness of about 10 micrometers and a length of several tens to several hundreds micrometers. The microphotograph of the pieces is shown in FIG. 1. The results of a qualitative analysis of Na - U according to a fluorescent X-ray analysis are shown in Table 1 below.

TABLE 1

| Sample No | | Fe | Nd | Pr | Pd | Zr | Y | Mo |
|---|---|---|---|---|---|---|---|---|
| Fe—B—Nd | 1 | SS | S | — | W | — | — | — |
| | 2 | SS | S | — | WW-W | W | — | — |
| | 3 | SS | S | W | W | — | W | — |
| | 4 | SS | S | — | — | — | — | W |

Note: SS = very large in amount, S = large, M = moderate, W = small, WW = very small The X-ray diffraction of the melt-quenched Fe-B-R alloys reveals that all the samples contain two types of orthorhombic and tetragonal $FeB_3$ but Fe-B, Fe-Nd, B-Nd and alpha-Fe are not present. From this, it is believed that the alloys have such a microstructure that an Fe-B-Nd ternary magnet phase is sporadically present in a metastable $Fe_3B$ phase.

On the other hand, a rare earth metal-cobalt alloy having a standard composition of $Sm(Co_{0.668}-Cu_{0.101}Fe_{0.214}Zr_{0.017})_{7.33}$ was provided in the form of particles having a size of from 10 to 80 micrometers.

The particles of the melt-quenched Fe-B-R alloy and the rare earth metal-cobalt alloy had, respectively, specific surface areas of 0.070 $m^2/g$ and 0.110 $m^2/g$. The respective particles were treated with a carbon functional silane in an amount necessary for forming a monomolecular layer on the surface of the individual particles. The silane used for this purpose was gamma-aminopropyl trimethoxysilane.

Figure 2:
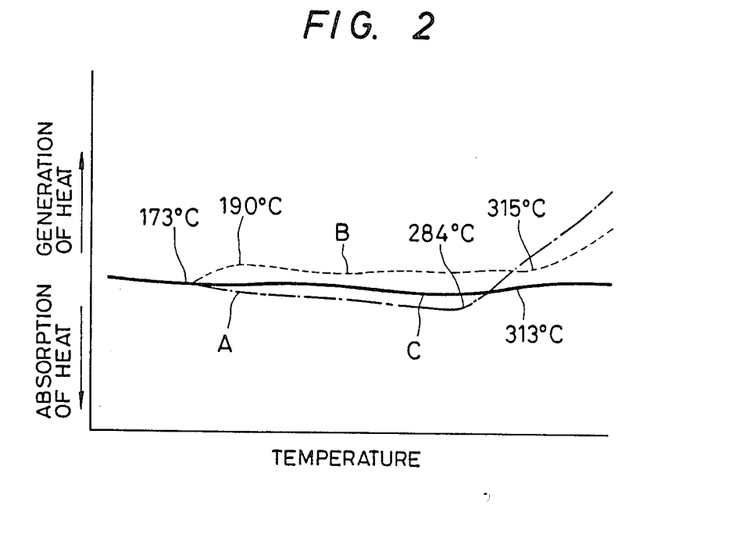
FIG. 2 is a graphical representation of the results of a differential thermal analysis of different types of magnetic materials.

FIG. 2 showed the results of a differential thermal analysis of 30 mg of the respective magnet alloys in air. In the figure, curve A is for the melt-quenched Fe-B-R alloy, curve B is for the rare earth metal-cobalt alloy, and curve C is for the melt-quenched Fe-B-R alloy treated with the silane on the surface thereof. As will be seen from the figure, the alloy used in the invention has a better oxidation resistance than the known rare earth metal-cobalt alloy. The silane treatment is effective in stabilizing the oxidation resistance at high temperatures.

EXAMPLE 2

Binder:

Binders for the melt-quenched Fe-B-R alloy particles are described in this example.

Oligoethers of the following formula (3) having different molecular weights were used as oligomers having alcoholic hydroxyl groups in the molecule thereof.

(3)

Because the above oligoether was an epichlorohydrin adduct, the end groups were each an epoxy group.

Isocyanate adducts used in combination with the oligoethers were, respectively, adducts of the following formulae (4), (5) and (6), i.e. a meta-cresol adduct of p,p'-diphenylmethane diisocyanate, a meta-cresol adduct of amido-imido diisocyanate obtained by decarbonation reaction between 1 mole of trimellitic acid and 2 moles of p,p'-diphenylmethane diisocyanate, and a meta-cresol adduct of imido diisocyanate obtained by decarbonation reaction between 1 mole of pyromellitic anhydride and 2 moles of p,p'-diphenylmethane diisocyanate.

For curing of the end epoxy groups of the oligoethers, p,p'-diphenylmethanediamine was used as an amine compound.

The mixing ratio of the oligoethers and the isocyanate adducts was determined such that a ratio of the isocyanate groups to the total of the end epoxy groups and the alcoholic hydroxyl groups was equivalent. The mixing ratio of the oligoether and the diamine was determined to be an equivalent ratio between the end epoxy groups and the active hydrogen atoms in the amine.

The respective binders were cured at 170° C. for 2 hours and subjected to determination of a glass transition temperature by a TBA method. The glass transition temperature of the respective binders is plotted against the molecular weight of the oligoether in FIG. 3. In the figure, curve A is for the imido diisocyanate, curve B is for the amidoimido diisocyanate, curve C is for p,p'-diphenylmethane diisocyanate, and curve D is for p,p'-diphenylmethanediamine for comparison.

Figure 3:
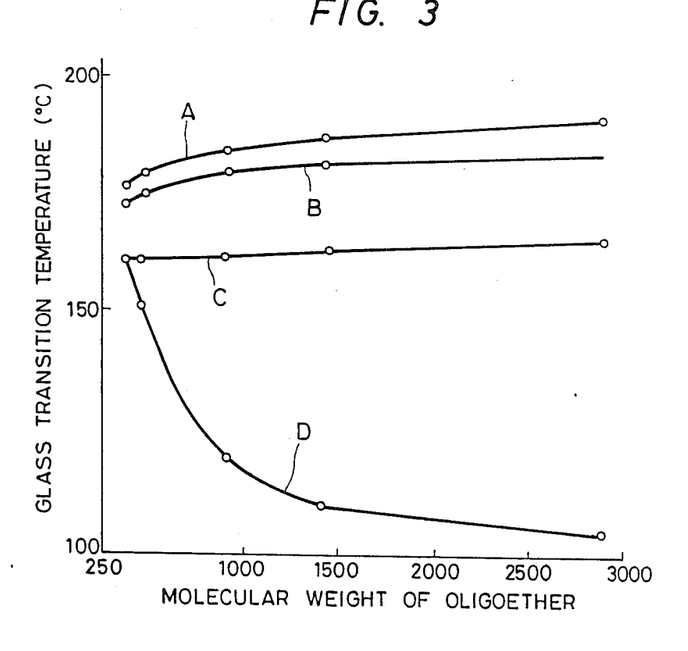
FIG. 3 is a graphical representation of a glass transition temperature in relation to a molecular weight of an oligoether for different types of block isocyanates.

As will be seen from the figure, when the molecular weight of the oligoether increases, the concentration of the epoxy end groups becomes low. Accordingly, a high glass transition temperature cannot be achieved in the case of the amine compound, but is ensured when using the isocyanate adducts.

EXAMPLE 3

Moldability:

Mixtures of melt-quenched Fe-B-Nd alloy particles and 3 wt % of combinations of oligoethers having different molecular weights and p,p'-diphenylmethane diisocyanate were each molded into a green body in the form of a hollow cylinder having an outer diameter of 8 mm, an inner diameter of 5.5 mm, a height of 4 mm and a density of 5.3 to 5.5 g/cm$^3$. The cylinder-crushing strength of the green body along the radial direction was determined by a method prescribed in JIS-Z-2507. The flow rate of the mixture was determined by a method prescribed in JIS-Z-2502. The strength and flow rate are, respectively, plotted against the molecular weight of the oligoether in FIG. 4. In the figure, curve A indicates the flow rate and curve B indicates the cylinder-crushing strength. It will be noted that the flow rate is determined as a ratio to a flow rate of a mixture using melt-quenched Fe-B-Nd particles treated with a carbon functional silane.

Figure 4:
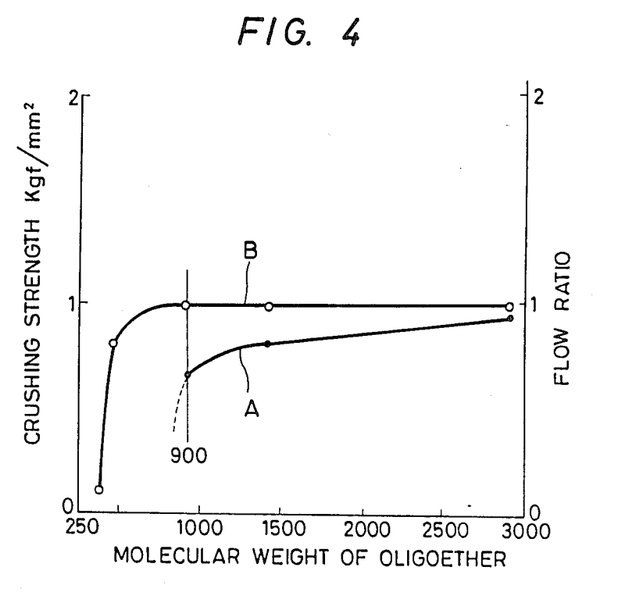
FIG. 4 is a graphical representation of flow rate and crushing strength in relation to variation in molecular weight of an oligoether.

The figure reveals that the flow rate of the mixture and the crushing strength of the green body are both dependent on the molecular weight of the oligoether. For a suitable molding operation of the mixture, the molecular weigth of the oligoether should preferably be not less than 900.

EXAMPLE 4

Mechanical Strength and Demagnetization:

Mixtures of melt-quenched Fe-B-Nd alloy particles and 3 wt % of combinations of oligoethers having different molecular weights and p,p'-diphenylmethane diisocyanate or p,p'-diphenylmethane diamine were each molded into a green body in the form of a cylinder having an outer diameter of 8 mm, and inner diameter of 5.5 mm, a height of 4 mm and a density of 5.3 to 5.5 g/cm$^3$, followed by curing at 170° C. for 2 hours to obtain a resin-bonded magnet. The resin-bonded magnets were each subjected to measurement of a cylinder-crushing strength and a demagnetizing factor. The demagnetizing factor was obtained from a crest or peak value, 20 KA, after deterioration for 500 hours in an atmosphere of 130° C. and a quantity of magnetic flux (Maxwell) when magnetized at 10 poles around the outer surface of the magnet. The crushing strength in an atmosphere of 130° C. and the demagnetizing factor are, respectively, plotted in FIGS. 5 and 6 against the molecular weight of the oligoether.

Figure 5:
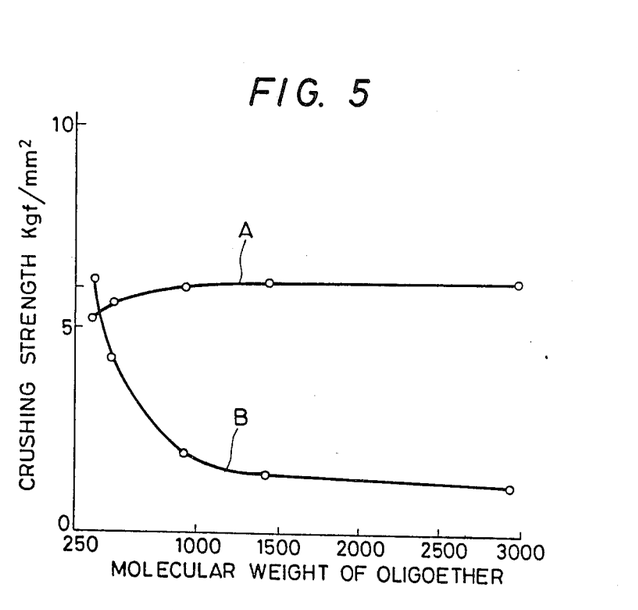
FIG. 5 is a graphical representation of crushing strength of a cylindrical body along the radial direction in relation to variation in molecular weight of an oligoether for different block isocyanates.
Figure 6:
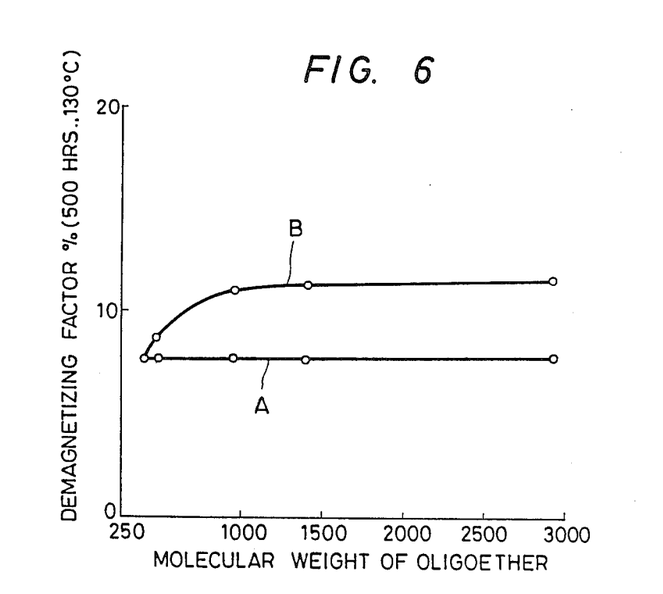
FIG. 6 is a graphical representation of demagnetizing factor in relation to variation in molecular weight of an oligoether for different different isocyanates.

In FIGS. 5 and 6, curves A are for p,p'-diphenylmethane diisocyanate and curves B are for p,p'-diphenylmethanediamine for comparison.

When reference is made to the relationship between the molecular weight of the oligoether and the glass transition temperature of the resin binder, it will be seen that the mechanical strength of the resin-bonded magnet at high temperatures and the demagnetizing factor are greatly influenced by the glass transition temperature.

The resin binder of the type in which the oligoether is cured by means of the isocyanate adduct makes it possible to ensure high glass transition temperatures independently of the molecular weight of the oligoether. Higher glass transition temperatures can be readily achieved by introduction of imido groups. From the above, it will be appreciated that the resin-bonded magnet of the invention can be fabricated reliably while the fabrication is relatively easy in view of the good flow rate of the mixture and the good crushing strength of the green body.

Upon the curing of the oligoether with the block isocyanates, the active hydrogen-bearing compound added to the isocyanate adduct is thermally dissociated and released. However, this compound does not influence the magnet, though left in the binder, since the magnet is a porous body having a relative density of about 75 to 80%. In addition, the dissociation at room temperature of the active hydrogen-bearing compound added to the isocyanate adduct is negligible, so that no specific care should be taken to the storage of the mixture with the particles of melt-quenched Fe-B-R alloy and the oligoether.

EXAMPLE 5

Characteristic Properties of Resin-bonded Magnets:

The sample Nos. 1 through 4 indicated in Table 1 were used to make resin-bonded magnets having a density of from 5.8 to 6.0 g/cm$^3$. These resin-bonded magnets were subjected to measurement of magnetic characteristics. For comparison, a rare earth metal-cobalt resin bonded magnet was made by injection molding and was rendered magnetically anisotropic along the axial direction. The results of the measurement are shown in Table 2 below.

TABLE 2

| Sample No. | Br (KG) | bHc (KOe) | (BH)max (MGOe) |
|---|---|---|---|
| Fe—B—R 1 | 6.1 | 5.2 | 7.9–8.1 |
| 2 | 6.0–6.2 | 5.1 | 7.7–8.0 |
| 3 | 5.9 | 4.9 | 7.1–7.2 |
| 4 | 6.1 | 5.3 | 8.0 |
| Sm—Co magnet | 6.5–6.8 | 5.5–5.8 | 9.4–9.8 |

The results of Table 2 demonstrate that the magnetic characteristics of the resin-bonded magnets according to the invention are not so influenced even though small amounts of Zr, Y and the like elements are contained in the melt-quenched Fe-B-R alloys.

When the resin-bonded magnets of the invention are molded under a compression pressure of, for example, 20 tons/cm$^2$, the magnetic characteristics are not so good as those of the injection-molded rare earth metal-cobalt resin-bonded magnet which has been rendered magnetically anisotropic along the axial direction. In this sense, the rare earth metal-cobalt resin-bonded magnet is considered to be very excellent as a resin-bonded magnet. However, when the melt-quenched Fe-B-R resin-bonded magnet is made as have a density of about 5.0 g/cm$^3$, a molding pressure required can lower to such an extent as to make a sintered product from metallic powder. Accordingly, the resin-bonded magnet of the invention can be fabricated relatively easily similar to the injection-molded rare earth metal-cobalt resin-bonded magnet.

Magnetic characteristics along the radial direction of cylindrical magnets which have different outer diameters but L/D=1 in which L is a length and D is an outer diameter, are described with respect to a melt-quenched Fe-B-R resin-bonded magnet having a density of 5.0 g/cm$^3$ and an injection-molded rate earth metal-cobalt resin-bonded magnet.

The injection-molded rare earth metal-cobalt resin-bonded magnet was made using a mold which had a magnetic core provided coaxially with a cylindrical cavity around which magnetic yokes and nonmagnetic yokes were alternately assembled and magnetizing coils, each divided into halves with the magnetic yoke, were provided at the outside. Upon the injection molding, the respective magnetizing coils were caused to generate a repulsion magnetomotive force of $3 \times 10^4$ A/m, thereby rendering the rare earth metal-cobalt magnetically anisotropic along the radial direction.

Figure 7:
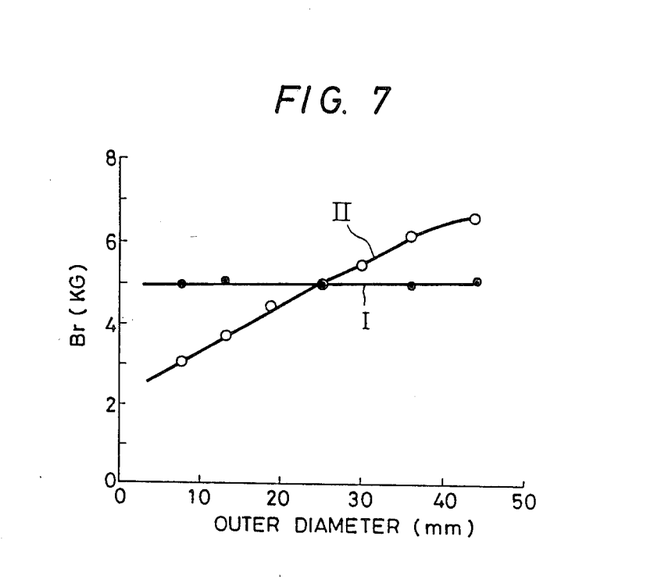
FIG. 7 is a graphical representation of residual magnetic flux density along a radial direction in relation to variation in an outer diameter of a cylindrical resin-bonded magnet.

FIG. 7 shows the relation between the outer diameter of the cylindrical magnet and the residual magnetic flux density along the radial direction. In the figure, curve I is for the melt-quenched Fe-B-R resin-bonded magnet and curve II is for the rare earth metal-cobalt resin-bonded magnet for comparison. As will be apparent from the figure, the rare earth metal-cobalt resin-bonded magnet, which is rendered magnetically anisotropic along the radial direction, is made in such a way that the magnetic flux generated from the magnetizing coils is focussed within the cavity by means of the yokes from the outer periphery of the mold. A substantial degree of magnetomotive force is consumed as a leakage magnetic flux as the diameter of the cavity becomes small. Accordingly, a smaller outer diameter results in a more difficulty in rendering the magnet magnetically anisotropic along the radial direction, thus lowering the magnetic characteristics. More particularly, the residual magnetic flux density of a magnet cylinder which has an outer diameter of 25 mm and is rendered magnetically anisotropic along the radial direction is about ¾ times that of a cylindrical magnet which is made magnetically anisotropic along the axial direction. If the size of the cylindrical magnet is further decreased, the magnetic flux decreases correspondingly. Thus, it will be appreciated that the known rare earth metal-cobalt resin-bonded magnet is not suitable for miniaturization and lightweight of a permanent magnet motor while keeping magnetic properties of the resin-bonded magnet.

In contrast, the melt-quenched Fe-B-R resin-bonded magnet of the invention is magnetically isotropic and suffers no influence of the size or shape of a cylindrical magnet with respect to magnetic properties along the radial direction. Accordingly, the resin-bonded magnet has wide utility in the field of permanent magnet motors which have the tendency toward miniaturization and lightweight while keeping their performance.

The melt-quenched Fe-B-R resin-bonded magnet with a density of 5.0 g/cm$^3$ has a maximum energy product of 5.2 MGOe. This value is over a maximum energy product of an isotropic rare earth metal-cobalt sintered magnet. In addition, since the magnet of the invention is not a sintered product but is a resin-bonded magnet, no ground finish is necessary after sintering with a high yield. In addition, the resin-bonded magnet is not mechanically brittle. This ensures a high dimensional accuracy and makes it difficult that the resin-bonded magnet comes off partially, thus the resin-bonded magnet being very useful in making a highly reliable permanent magnet motor.

EXAMPLE 6

Figures 8, 10:
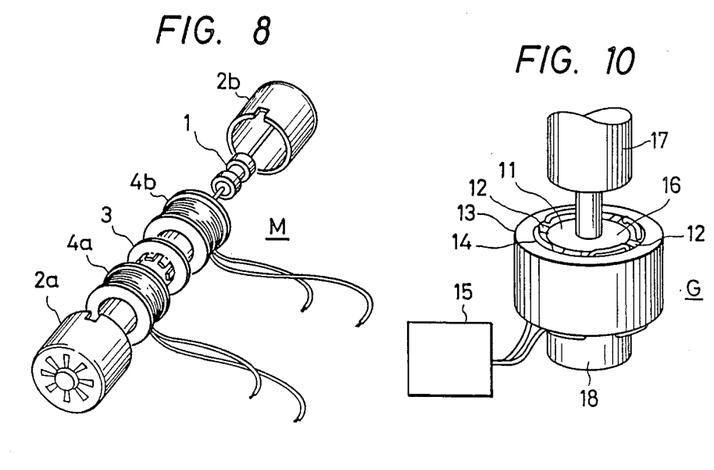
FIG. 8 is a schematic exploded view of a permanent magnet-type motor using a resin-bonded magnet according to the invention.
FIG. 10 is a schematic perspective view of a magnetic field generator for magnetically aligning particles of a ferromagnetic FE-B-R powder.

Properties of Permanent Magnet Motor Using A Melt-Quenched Fe-B-R Resin-bonded Magnet:

A permanent magnet rotor-type motor was fabricated as shown in FIG. 8 which is a perspective exploded view of a small-sized permanent magnet rotor-type motor. In the figure, there is generally shown a permanent magnet rotor-type motor M. The motor M includes a rotor 1 having a magnet and a stator S. The stator S has outer yokes 2a, 2b and an inner yoke 3 bonded to the outer yokes 2a, 2b. Energizing coils 4a, 4b are each accomodated between the respective outer and inner yokes. This type of motor is a so-called PM-type pulse motor in which the rotor is displaced only by one step angle by the action of a magnetomotive force from the energizing coils corresponding to a one pulse current.

In this example, the rotor 1 was made of a melt-quenched Fe-B-R magnet in the form of a cylinder having an outer diameter of 8 mm and having a density of 5.0 g/cm$^3$. The magnet was uniformly magnetized decapolarly along the outer surface thereof. For comparison, a rare earth metal-cobalt resin-bonded magnet which had been rendered magnetically anisotropic along the radial direction was used instead of the resin-bonded magnet of the invention.

Figure 9:
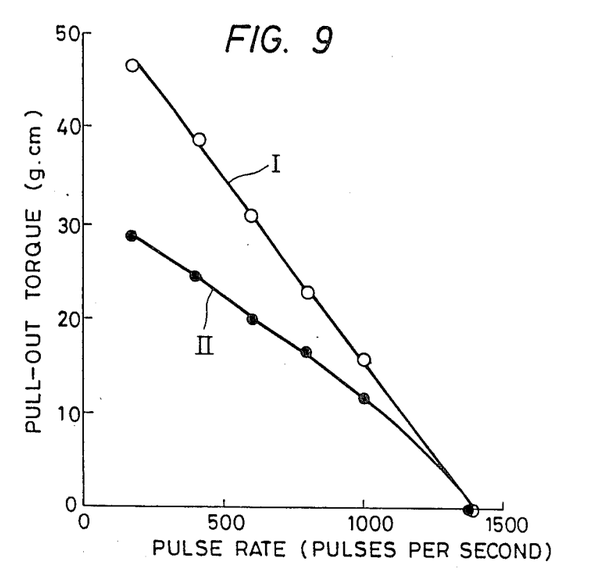
FIG. 9 is a graphical representation of pull-out torque in relation to a pulse rate of a motor using a permanent magnet rotor.

These motors were each subjected to measurement of pull-out torque in relation to pulse rate. In the figure, line I is for the permanent magnet motor using the melt-quenched Fe-B-R resin-bonded magnet rotor and line II is for the motor using the rare earth metal-cobalt resin-bonded magnet rotor. Other characteristic properties were also measured with the results shown in Table 3 below.

TABLE

|  | Holding Torque g · cm | Maximum Magnetomotive Frequency pulses per second | Maximum Response Frequency pulses per second |
|---|---|---|---|
| Motor using melt-quenched Fe—B—R resin-bonded magnet | 83 | 980 | 1360 |
| Motor For comparison using magnetically anisotropic Sm—Co resin-bonded magnet | 60 | 900 | 1330 |

As will be apparent from FIG. 9 and the results of Table 3, the cylindrical resin-bonded magnet of the invention can provide a better permanent magnet motor than the known rare earth metal-cobalt resin-bonded magnet which has been rendered magnetically anisotropic along the radial direction. These better characteristics are ensured so far as the cylindrical magnet of the invention has an outer diameter of not larger than 25 mm and a density of not less than 5.0 g/cm$^3$ and is made of melt-quenched Fe-B-R particles dispersed in a resin binder.

EXAMPLE 7

In this example, melt-quenched alloy particles dispersed in a resin binder are magnetically aligned and subsequently fixed to give a Fe-B-R resin-bonded magnet. Properties of a permanent magnet motor using the above magnet are described.

A means for generating magnetic field in order to align the quenched Fe-B-R alloy particles is described with reference ot FIG. 10. FIG. 10 shows a magnetic field generator means G having a molding cavity 11, around which an aligning yoke 13 having a plurality of magnetic poles 12 and a conductive wire 14 in the yoke 13. The conductive wire 14 is connected to an instantaneous DC power supply 15 in which an AC voltage is converted to a DC voltage and, after boosting and rectification, is charged to a group of capacitors, followed by discharge through a thyristor.

A mixture 16 of a ferromagnetic powder and a resin binder is charged into the cavity and compressed by means of punches 17, 18.

A mixture of 97 wt % of melt-quenched Fe-B-R particles and the balance of a resin binder was charged into the cavity 11 having an outer diameter of 8 mm, an inner diameter of 5.5 mm and a height of 4.1 mm. The punches 17, 18 were vertically moved to such an extent as corresponding to an apparent density of the mixture. Thereafter, a pulse current having a peak value of 20 KA and a pulse width of 400 microseconds was passed across the conductive wire 14, thereby generating a pulse magnetic field in the cavity. As a result, the Fe-B-R particles in the cavity were partially aligned by the action of the pulse magnetic field. Thereafter, the mixture was compressed with the facing punches 17, 18 to obtain a resin-bonded magnet having a density of 5.0 g/cm$^3$. The resin binder was then cured to fix the particles.

Figure 11A:
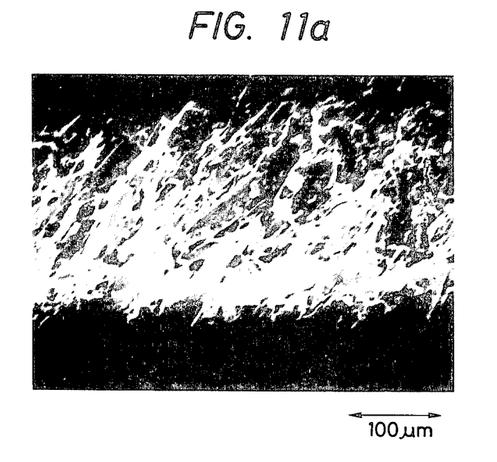
FIGS. 11a and 11b are, respectively, microphotographs of a magnetic pole in which plate-like particles of a melt-quenched Fe-B-R alloy are magnetically aligned and fixed and a portion between magnetic poles in which the particles of the Fe-B-R alloy are randomly fixed.
Figure 11B:
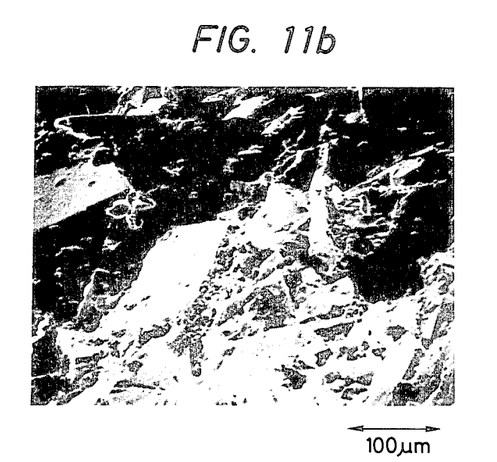

FIGS. 11a and 11b are, respectively, scanning electromicrophotographs showing particulate structures of a magnetic pole portion and a portion between magnetic poles of the melt-quenched Fe-B-R alloy magnet. More particularly, FIG. 11a shows a magnetic pole portion where the quenched Fe-B-R alloy particles are fixed with the resin binder after the magnetic alignment and FIG. 11b shows a portion between magnetic poles where the quenched Fe-B-R alloy particles are randomly fixed. The microphotographs reveal that the magnetic pole portion where the particles are magnetically aligned has a higher concentration of the alloy particles than the portion between the magnetic poles.

Figure 12:
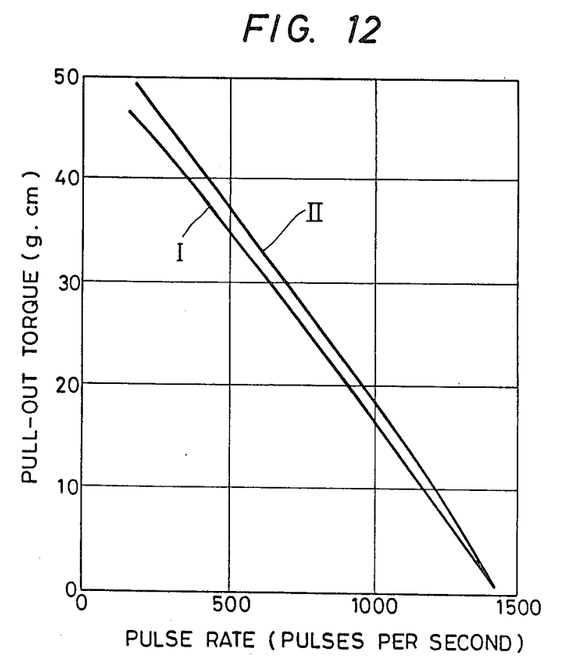
FIG. 12 is a graphical representation of pull-out torque of a permanent magnet rotor-type motor using a resin-bonded magnet, in which Fe-B-R particles obtained by melt-quenching are magnetically aligned and fixed with a resin binder, in relation to pulse rate.

FIG. 12 shows the relation between pull-out torque and pulse rate of a permanent magnet rotor-type motor using the melt-quenched Fe-B-R resin-bonded magnet in which the Fe-B-R alloy particles are magnetically aligned. In the figure, curve I is for the motor using the magnet where melt-quenched Fe-B-R alloy particles are not aligned and curve II is for the aligned magnet. From the figure, it will be seen that the performance of the motor is improved because of the higher density at the magnetic pole portion in case where the melt-quenched Fe-B-R alloy particles are magnetically aligned and fixed with a binder although the magnet has macroscopically the same density as a resin-bonded magnet of the quenched Fe-B-R alloy particles which are not magnetically aligned.

EXAMPLE 8

Figure 13:
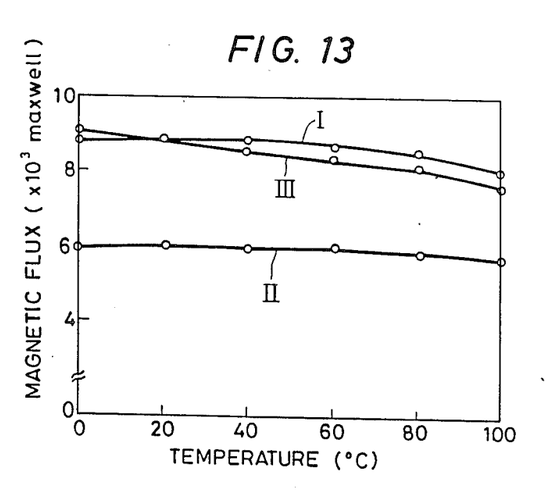
FIG. 13 is a graphical representation of an amount of magnetic flux in relation to temperature for different types of motors using resin-bonded magnets of the invention and a rare earth metal and cobalt resin-bonded magnet for comparison.

Permanent magnet rotor-type motors as shown in FIG. 8 were made using resin-bonded magnets of melt-quenched Fe-B-R alloys which had composition Nos. 1 to 4 of Table 1 and also using an injection-molded rare earth metal-cobalt resin-bonded magnet for comparison. These motors were subjected to measurement of a quantity of magnetic flux as a function of temperature. The results are shown in FIG. 13, in which curve I is for composition Nos. 1 to 3, curve II is for the rare earth metal-cobalt alloy, and curve III is for composition No. 4. The results reveal that the permanent magnet motors using the melt-quenched Fe-B-R resin-bonded magnets exhibit a good magnetic flux characteristic over a wide temperature range. The addition of Pd to the Fe-B-R alloy is preferred as compared with composition No. 4 where no Pd Is used.

What is claimed is:

1. A resin-bonded magnet which comprises particles of a melt-quenched ferromagnetic material of the formula, Fe-B-R, in which R represents Nd and/or Pr, and a binder resin dispersing the particles throughout the resin and fixing the particles, the binder resin comprising an oligomer having at least an alcoholic hydroxyl group and an adduct of an isocyanate with an active hydrogen-bearing compound.

2. A resin-bonded magnet according to claim 1, wherein said ferromagnetic material has the general formula of $Nd_{1-x}(Fe_{1-y}, B_y)_x$ in which $0.5 \leq x \leq 0.9$ and $0.05 \leq y \leq 0.10$.

3. A resin-bonded magnet according to claim 1, wherein R is Nd.

4. A resin-bonded magnet according to claim 1, wherein said ferromagnetic material is in the form of particles having a thickness of about 10 to 30 micrometers and a length of several tens to several hundreds micrometers.

5. A resin-bonded magnet according to claim 1, wherein the individual particles of the ferromagnetic material particles have a carbon functional silane layer on the surface thereof.

6. A resin-bonded magnet according to claim 5, wherein the carbon functional silane is gamma-glycidoxypropylmethoxysilane, gamma-aminopropyltrimethoxysilane, N-beta-aminoethyl)-gamma-aminopropyltrimethoxysilane, or gamma-mercaptopropyltrimethoxysilane.

7. A resin-bonded magnet according to claim 1, wherein said oligomer is an oligoether of the following formula (1) or an oligoether ester of the following formula (2)

-continued (2)

in which in which $R_1$ is —S—, —O—, —SO—, —SO$_2$— or an aliphatic residue, each $R_2$ represents hydrogen or a lower alkyl group, $R_3$ represents or —CH$_2$=Ch$_2$—, and n and m are, respectively, an integer of from 1 to 100.

8. A resin-bonded magnet according to claim 7, wherein said oligomer is an oligoether having a molecular weight not less than 900.

9. A resin-bonded magnet according to claim 1, wherein said isocyanate adduct consists of an aromatic isocyanate and an active hydrogen-bearing compound.

10. A resin-bonded magnet according to claim 9, wherein said aromatic isocyanate has an aromatic imido residue.

11. A resin-bonded magnet according to claim 1, wherein said oligomer and said isocyanate adduct are used in amounts sufficient to make a stoichiometrically equivalent ratio between the alcoholic hydroxyl groups in said oligomer and the isocyanate groups.

12. A resin-bonded magnet according to claim 1, wherein said resin binder is used in an amount not larger than 6 wt % of the resin-bonded magnet.

13. A resin-bonded magnet according to claim 1, wherein said particles are fixed after magnetic alignment of the particles.

14. A resin-bonded magnet according to claim 1, wherein said magnet is in the form of a cylinder, ring or column having an outer diameter of not larger than 25 mm and a density of not less than 5.0 g/cm$^3$.

* * * * *